United States Patent Office 3,513,149
Patented May 19, 1970

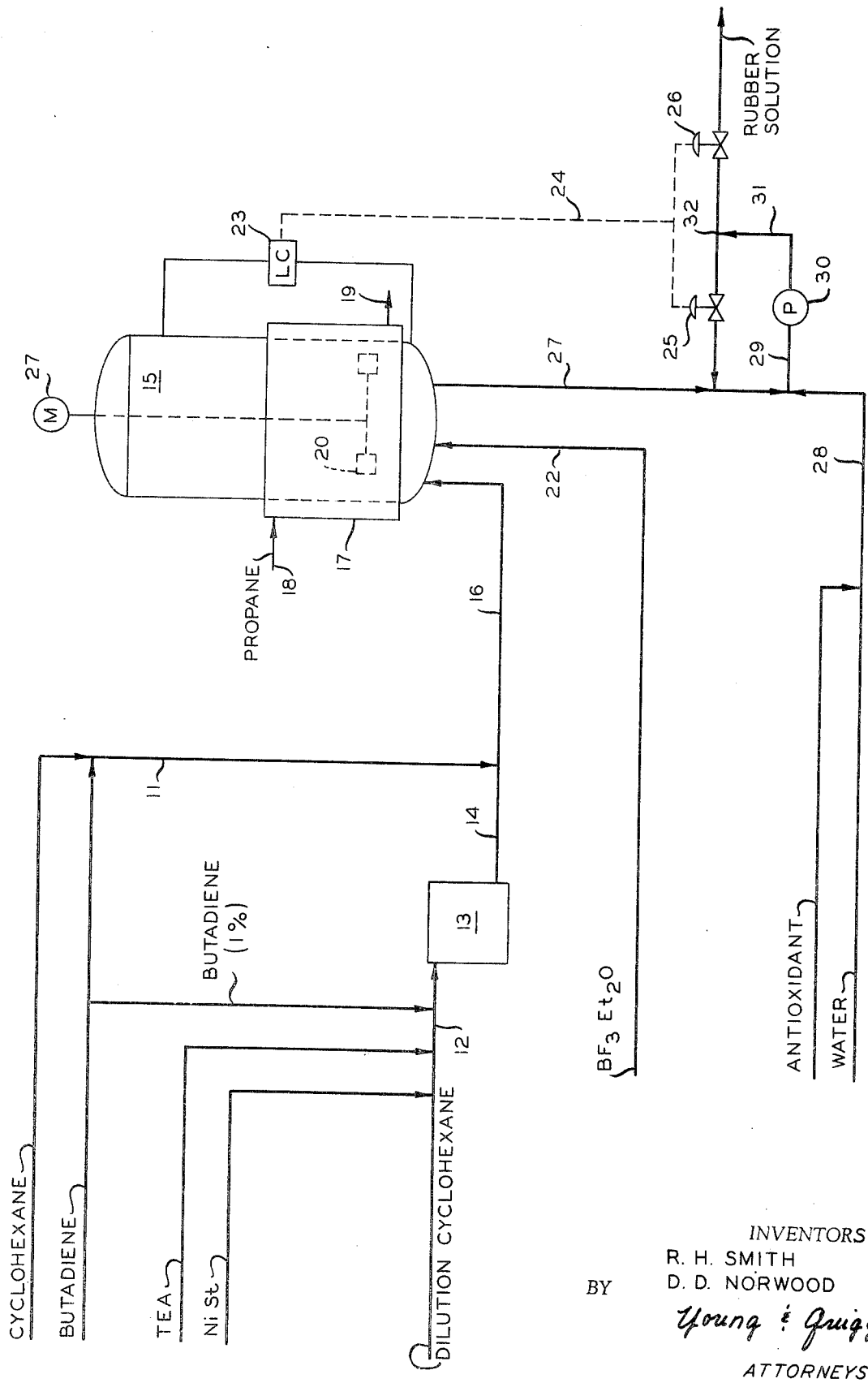

3,513,149
GEL REDUCTION IN CIS-POLYBUTADIENE PROCESS
Robert H. Smith, Lawrence, Kans., and Donald D. Norwood, Bartlesville, Okla., assignors to Phillips Petroleum Company, a corporation of Delaware
Filed Dec. 11, 1967, Ser. No. 689,534
Int. Cl. C08d 3/06
U.S. Cl. 260—94.3    10 Claims

ABSTRACT OF THE DISCLOSURE

When polymerizing 1,3-butadiene to cis-polybutadiene using a catalyst comprising (1) a nickel compound, (2) lithium aluminum hydride or an organometallic compound, and (3) boron trifluoride, boron trifluoride etherate, or hydrogen fluoride, negligible gel is produced by using a single continuous polymerization zone operating at steady state conditions with a weight ratio of polymer to monomer of at least 9.

This invention relates to the polymerization of 1,3-butadiene. In another aspect it relates to a method for reducing gel formation in the polymerization of 1,3-butadiene.

Negligible gel formation is a very desirable characteristic in most polymerization processes. There is frequently a serious problem of gel formation when using a catalyst comprising a nickel compound, lithium aluminum hydride or an organometallic compound, and a fluoride of boron or hydrogen for polymerization of 1,3-butadiene. Gel buildup on reactor walls limits heat transfer and necessitates frequent shutdown and cleaning of the reactor. Gel globs can plug product lines and force immediate shutdown. Gel is also undesirable in the polymer product for its presence creates difficulty in obtaining a homogeneous polymer suitable for compounding and its removal entails the use of special equipment.

It has been common practice in the past to carry out such polymerization processes as described above in a multi-reactor train. Large amounts of gel tend to be produced in the first reactor and lesser amounts in each subsequent reactor. The first reactor also has the largest percentage conversion of monomer to polymer and it has been thought that this was the reason for the large amount of gel formation.

It has now been discovered that when a high polymer to monomer weight ratio is maintained in a single continuous reactor the amount of gel formation is negligible. A high conversion of monomer can be obtained with negligible gel formation by using a single continuous reactor operating at steady state conditions with a high polymer to monomer ratio.

It is an object of this invention to provide a process for the polymerization of 1,3-butadiene. It is another object of this invention to reduce gel production in the polymerization of 1,3-butadiene.

Other aspects, advantages, and objects of this invention will be apparent to those skilled in the art upon studying the accompanying disclosure, claims, and drawing which is a schematic flow diagram of the process of this invention.

To more fully describe this invention reference is now made to the drawing. In discussing the process in connection with the drawing reference is made to specific materials and reaction conditions for purposes of simplicity. It should be understood, however, that this invention is not limited in this fashion.

Butadiene and cyclohexane are metered and pumped continuously through line 11. Catalyst components of nickel stearate (NiSt), triethylaluminum (TEA), dilution cyclohexane, and a portion of the butadiene, for example about 1 weight percent of the total butadiene, are metered and pumped through line 12 to the premixer 13. After leaving the premixer in line 14, the catalyst is combined with the butadiene and cyclohexane in line 11 and passed to reactor 15 through line 16. Propane coolant is fed into the reactor cooling jacket 17 through line 18 and withdrawn through line 19. The reactor mixture is stirred by rotating agitator 20 by means of motor 27. Boron trifluoride ethyl etherate ($BF_3 \cdot Et_2O$) is metered and pumped into reactor 15 through line 22. The reactor liquid level controller 23 measures the height of liquid in reactor 15 and transmits a signal through line 24 to valves 25 and 26. When controller 23 indicates that the level in reactor 15 is higher than a specified value valve 25 closes slightly and valve 26 opens slightly allowing additional polymer solution to flow through line 27. Antioxidant and water are metered and pumped through line 28 and combined with the polymer in line 27. The resultant mixture is pumped through line 29 by pump 30 to line 31 where it flows into T 32 from which part of it is recycled through valve 25 and returned to line 27 and the remaining part is passed through valve 26 to rubber solution storage, the magnitude of each part depending upon the positions of valves 25 and 26 set by controller 23.

The catalyst used in the butadiene polymerization process forms on mixing materials comprising (1) a nickel component, (2) lithium aluminum hydride or an organometallic component, and (3) boron trifluoride, boron trifluoride etherate, or hydrogen fluoride.

The organometallic compounds and lithium aluminum hydrides that can be used in the process of the invention are compounds having the formula $R_mAlCl_n$, $LiAlH_xR_{(4-x)}$ or $R_yM$ wherein R is a saturated aliphatic, saturated cycloaliphatic or aromatic radical or combinations thereof containing from 1 to 20 carbon atoms, $m$ and $n$ are integers of 1 or 2 such that $m+n=3$, $x$ is an integer of from 0 to 4, M is lithium, sodium, potassium, rubidium, cesium, beryllium, magnesium, zinc, cadmium, aluminum, gallium, or indium, and $y$ is an integer equal to the valence of the metal. Mixtures of the foregoing organometallic compounds can be used. Preferred organometallic compounds include trialkylaluminum compounds and lithium aluminum tetraalkyl compounds.

Examples of suitable organometallic compounds include trimethylaluminum, triethylaluminum, triisobutylaluminum, tri-n-eicosylaluminum, triphenylaluminum, methylaluminum sesquichloride, ethylaluminum sequihalide, lithium aluminum dimethyl dihydride, lithium aluminum butyl trihydride, lithium aluminum tri-n-decyl hydride, lithium aluminum n-eicosyl trihydride, lithium aluminum tetraethyl, lithium aluminum tetrabutyl, N-butyllithium, 4-tolylaluminum dichloride, diphenylaluminum chloride, 2-naphthyllithium, diethylmagnesium, diphenylmagnesiupm, trimethylgallium, diethylphenylgallium, tribenzylgallium, 4-methylcyclohexyl potassium, benzyllithum, n-eicosyllithium phenylsodium, cyclohexylpotassium, isobutylrubidium, n-nonylcesium, diethylberyllium, diphenylberyllium, diethylzinc, dicyclopentylzinc, di-n-propylcadmium, dibenzylcadmium, trimethylindium, triphenylindium, and the like.

The nickel component used in this invention can be metallic nickel having a large surface area for its weight or a reducible nickel compound. When metallic nickel is used it should be in the form of a colloid, fine powder or porous solid such as reduced nickel adhered to carriers or Raney type nickel. The nickel compounds used in this invention are those nickel compounds that are capable of being reduced by the above described organometallic compounds. In the desired reduction reaction the nickel is reduced to a lower valence state. The desired reduction is accomplished by contacting the nickel compound with the above described organometallic compound or lithium aluminum hydride. Suitable reducible nickel compounds include nickel oxide, nickel salts of inorganic acids and organic acids, nickel salts of beta-diketones of the formula:

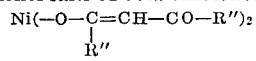

wherein R″ is a saturated aliphatic, saturated cycloaliphatic or aromatic radical or combination thereof, containing from 1 to 10 carbon atoms, and complex compounds such as dicyclopentadienylnickel, nickel tetracarbonyl, and the nickel complex with the ethyl ester of acetoacetic acid. Examples of suitable nickel salts include the nickel salts of hydrochloric acid, hydrobromic acid, hydroiodic acid, sulfuric acid, nitric acid, phosphoric acid, caprylic acid, capric acid, lauric acid, myristic acid, palmitic acid, stearic acid, arachidic acid, cyclobutanecarboxylic acid, cyclohexanecarboxylic acid, benzoic acid, and 2-naphthoic acid. Examples of suitable nickel salts of the beta-diketones include the nickel salts of 2,4-pentanedione (acetylacetone), 3,5-heptanedione, 1,5-dicyclopentyl-2,4-pentanedione, and the like. Mixtures of the foregoing nickel components can be used.

Nickel compounds that are reduced with the lithium aluminum hydride or the organometallic compounds are preferred in the process of the invention.

It is within the scope of this invention to utilize nickel components that are supported on various carriers such as diatomaceous earth, silica-alumina, silica, alumina, titania, zirconia, kaolin, ion-exchange resins and the like. The metallic nickel or the reducible nickel compound, such as nickel oxides and the like, can be supported on the above-mentioned carriers.

The fluoride compound utilized in this invention is selected from the group consisting of boron trifluoride, boron trifluoride complexed with an ether having from 1 to 20 carbon atoms per molecule, and hydrogen fluoride.

In preparing the catalyst compositions, preferably the nickel component and the lithium aluminum hydride or organometallic compound are first mixed in the solvent. The mixture is maintained at a temperature within the range of 32 to 170° F. for sufficient time to allow the materials to react. The reaction time is dependent upon the temperature and is generally in the range of 1 minute to 50 hours. Preferably, this reaction is conducted in the presence of a portion of the monomer to be used in the polymerization. By adding a small amount of butadiene to this catalyst premixing step, the conversion level is more stable and it becomes easier to control the polymer to monomer ratio in the polymerization reaction. Ordinarily about 0.1 to 5 weight percent, preferably about one percent, of the total butadiene is added to this premixing step. The third component in the catalyst system is preferably charged to the polymerization as a separate ingredient but can be combined with the other catalyst components in a premixing step.

The mol ratio of nickel component to lithium aluminum hydride or organometallic compound is in the range of about 0.05:1 to 1:1, preferably 0.1:1 to 0.5:1. The mol ratio of hydrogen fluoride or boron compound to lithium aluminum hydride or organometallic compound is in the range of about 0.5:1 to 5:1, preferably 1:1 to 4:1.

The polymerization is generally carried out in the presence of a hydrocarbon diluent. Suitable diluents include paraffinic, cycloparaffinic and aromatic hydrocarbons such as n-pentane, n-hexane, isooctane, cyclohexane, benzene, toluene, and the like, and mixtures of the above.

The polymerization temperature is generally in the range of 0° F. to 250° F., preferably in the range of 100° F. to 200° F.

The weight ratio of cyclohexane to butadiene is generally in the range of 1:1 to 10:1, preferably in the range of 2:1 to 8:1. The ratio of catalyst to monomer is usually based upon the nickel component and is generally in the range of 0.01 to 1, preferably in the range of 0.04 to 0.5 millimole (milligram atoms in the case of metallic nickel) of nickel component per 100 grams of monomer.

The polymerization is carried out in a single reactor. The reactor should be operated in such a manner that it is operating with at least 9, preferably at least 19, parts by weight of polymer per part by weight of monomer. This method of operation not only keeps gel formation minimal but also enables production of soluble polymer with uniform molecular weight distribution.

The polymerization is terminated by the addition of a shortstop and/or water or by any other method known in the art. The thus treated polymer is then separated and dried by conventional means.

The advantages of this invention are further illustrated by the following example. The example should not be considered in such a way as to unduly limit the scope of the invention.

Mooney viscosity values were determined according to the procedure of ASTM D–1646–63. Cold flow was measured by extruding the rubber through a ¼ inch orifice at 3.5 p.s.i. pressure and at a temperature of 50 C. (122° F.). After allowing 10 minutes to reach steady state, the rate of extrusion was measured and reported in milligrams per minute.

EXAMPLE

A 15-gallon reactor equipped with a double spiral agitation system for operation with viscous solutions was employed. The agitation system comprised an outer helical ribbon that swept within about one-half inch of the reactor wall and a similar but smaller helical ribbon rotating in the center of the reactor. Heat of reaction was removed by circulating coolant such as propane through a jacket surrounding the reactor. As shown in the drawing all of the triethylaluminum (TEA) and nickel stearate (NiSt) were premixed with one percent of the total butadiene and a small amount of cyclohexane solvent in a small premix contactor with a capacity of 2000 cubic centimeters. Average steady state reaction conditions over a period of 5 days of continuous operation were as follows:

Recipe

Cyclohexane—400 parts by weight
Butadiene—101 parts by weight
Nickel stearate—0.060 part by weight
Triethylaluminum—0.547 part by weight
Boron trifluoride etherate—0.218 part by weight
Catalyst mole ratio: BF₃Et₂O/N:Stearate/TEA—3.2/0.2/1
Premixer temperature—85° F.
Reactor temperature—126° F.
Reactor pressure—100 p.s.i.g.
Reactor residence time—3 hours
Premixer residence time—5 minutes
Conversion, wt. percent—97
Mooney, ML–4—56
Cold flow, mg./min.—0.13
Cis content, wt. percent—97

When the single continuous reactor assumed steady state conditions the polymer to monomer weight ratio was about 23. The Mooney viscosity value (ML-4) of the rubber was 56 and the cold flow was measured to be 0.10 mg./min.

After a week of operation, the reactor walls and agitator were free of gel, a condition not observed in a three reactor train. In a comparable run using a three-reactor train with an over-all residence time of three hours, and an ultimate conversion of 95 percent, but with a polymer to monomer ratio in the first reactor below 9 to 1, a high amount of gel formed in the first reactor and lesser amounts formed in the second and third reactors.

Various modifications of this invention can be made in view of the foregoing disclosure without departing from the spirit and scope thereof.

What is claimed is:

1. An improved polymerization process for reducing gel formation in the polymerization of 1,3-butadiene with a catalyst which forms on mixing materials comprising (1) a nickel component selected from metallic nickel having a large surface area for its weight or reducible nickel compound, (2) lithiumaluminum hydride or an organometallic compound having the formula $R_mAlCl_n$, $LiAlH_xR_{(4-x)}$ or $R_1M$ wherein R is a saturated aliphatic, saturated cycloaliphatic or aromatic radical or combination thereof containing from 1 to 20 carbon atoms, $m$ and $n$ are integers of 1 or 2 such that $m+n=3$, $x$ is an integer of from 0 to 3, and M is lithium, sodium, potassium, rubidium, cesium, beryllium, magnesium, zinc, cadmium, aluminum, gallium, or indium, and $y$ is an integer equal to the valence of the metal and (3) boron trifluoride, boron trifluoride etherate, or hydrogen fluoride which comprises carrying out said polymerization in a single continuous polymerization zone operating at steady state conditions and maintaining the weight ratio of butadiene polymer to butadiene monomer in said zone at least 9.

2. The method of claim 1 wherein said weight ratio is at least 19.

3. The method of claim 1 wherein the reaction mixture in said single continuous reaction zone is mechanically agitated and cooled by indirect heat exchange.

4. The method of claim 1 wherein the mol ratio of said nickel component to said lithium aluminum hydride or said organometallic compound is in the range of 0.05:1 to 1:1; and the mol ratio of said boron trifluoride, said boron trifluoride etherate, or said hydrogen fluoride to said lithium aluminum hydride or said organometallic compound is in the range of 0.5:1 to 5:1.

5. The method of claim 4 wherein the amount of catalyst added to said zone is 0.01 to 1 millimoles of nickel component per 100 grams of butadiene monomer added to said zone.

6. The method of claim 5 wherein the reaction temperature is in the range of 0 to 250° F.

7. The method of claim 5 wherein a catalyst premixture is formed by mixing said nickel component and said lithium aluminum hydride or said organometallic compound with at least part of the reactor diluent and approximately 1 weight percent of the total butadiene prior to introduction of said nickel component and said lithium aluminum hydride or said organometallic compound into said reactor.

8. The method of claim 7 wherein said premixture is maintained at a temperature in the range of 32 to 170° F. for a period in the range of 1 minute to 50 hours prior to introduction into said reaction zone.

9. The method of claim 8 wherein the said reactor diluent is cyclohexane and the weight ratio of said diluent added to said butadiene monomer is in the range of 1 to 10.

10. The method of claim 9 wherein said catalyst is formed from nickel stearate, triethylaluminum and boron trifluoride ethyl etherate.

References Cited

UNITED STATES PATENTS

| 3,170,905 | 2/1965 | Ueda et al. | 260—94.3 |
| 3,170,907 | 2/1965 | Ueda et al. | 260—94.3 |
| 3,257,363 | 6/1966 | Miller et al. | 260—88.2 |

JOSEPH L. SCHOFER, Primary Examiner

R. A. GAITHER, Assistant Examiner